United States Patent
Gort-Barten et al.

(10) Patent No.: US 11,926,447 B2
(45) Date of Patent: Mar. 12, 2024

(54) RECYCLING OF INFUSION CAPSULES

(71) Applicants: Leslie Alexander Gort-Barten, Crawley (GB); Alexander Charles Gort-Barten, Crawley (GB)

(72) Inventors: Leslie Alexander Gort-Barten, Crawley (GB); Alexander Charles Gort-Barten, Crawley (GB)

(*) Notice: Subject to any disclaimer, the term of this patent is extended or adjusted under 35 U.S.C. 154(b) by 812 days.

(21) Appl. No.: 17/002,205

(22) Filed: Aug. 25, 2020

(65) Prior Publication Data
US 2021/0060628 A1    Mar. 4, 2021

(30) Foreign Application Priority Data
Aug. 29, 2019 (GB) ................... 1912385

(51) Int. Cl.
*B09B 3/00* (2022.01)
*B09B 5/00* (2006.01)
(Continued)

(52) U.S. Cl.
CPC ........... *B65B 69/0058* (2013.01); *B09B 3/00* (2013.01); *B09B 5/00* (2013.01); *B30B 9/3014* (2013.01);
(Continued)

(58) Field of Classification Search
CPC . B30B 9/3085; B30B 9/3014; B65B 69/0058; B65B 69/005; B09B 3/00;
(Continued)

(56) References Cited

U.S. PATENT DOCUMENTS 5,472,115 A * 12/1995 Whiton ............... B65B 69/0058
221/25
6,758,367 B2 * 7/2004 Hunts ................. B65B 69/0058
414/412
(Continued)

FOREIGN PATENT DOCUMENTS

| CN | 2440032 Y | 7/2001 |
| CN | 2753714 Y | 1/2006 |

(Continued)

OTHER PUBLICATIONS

Search Report issued for GB1912385.0 dated Feb. 10, 2020.
(Continued)

*Primary Examiner* — Jimmy T Nguyen
(74) *Attorney, Agent, or Firm* — Westman, Champlin & Koehler, P.A.; Z. Peter Sawicki; Amanda M. Prose

(57) ABSTRACT

A device for separating infusion capsules includes a base unit and a plunger, the base unit having a face with an aperture for receiving a body part of the capsule, wherein a portion of the face surrounding the aperture has a surface that undulates in a longitudinal direction relative to a central axis through the aperture; the plunger including a projection sized to fit within the aperture. A capsule can be placed, rim side down, on the base unit over the aperture, and the plunger used to urge the capsule down into the aperture. The result is that the capsule inverts, rupturing the foil layer and emptying the coffee or other infusion into the base unit below the aperture. The coffee (etc) and the capsule can then be removed for separate recycling. The undulating surface ensures that the rim section of the capsule is distorted during this process, which assists in separating any layers that have been provided for example by way of sealant.

15 Claims, 3 Drawing Sheets

(51) Int. Cl.
  *B30B 9/30* (2006.01)
  *B65B 69/00* (2006.01)
  *B09B 101/02* (2022.01)
  *B65D 85/804* (2006.01)

(52) U.S. Cl.
  CPC ...... *B09B 2101/02* (2022.01); *B65D 85/8046* (2013.01)

(58) Field of Classification Search
  CPC ... B09B 5/00; B09B 2101/02; B65D 85/8046; B29B 17/0052; B29B 2017/0057; B29B 2017/0063; A47J 31/44
  See application file for complete search history.

(56) References Cited

U.S. PATENT DOCUMENTS

| | | |
|---|---|---|
| 2010/0050880 A1 | 3/2010 | Suter et al. |
| 2019/0047241 A1 | 2/2019 | Magnus |

FOREIGN PATENT DOCUMENTS

| | | | | |
|---|---|---|---|---|
| DE | 202015004438 U1 | 10/2015 | | |
| EP | 0512148 A1 | 11/1992 | | |
| ES | 1068799 U | 12/2008 | | |
| ES | 1148286 Y | 3/2016 | | |
| ES | 1236964 U | 11/2019 | | |
| ES | 1241931 U | 2/2020 | | |
| FR | 2937627 A1 | 4/2010 | | |
| IT | UA20161839 A1 | 9/2017 | | |
| WO | 2004035459 A1 | 4/2004 | | |
| WO | WO-2004035459 A1 * | 4/2004 | ......... | B65B 69/0058 |
| WO | WO-2019224408 A1 * | 11/2019 | ............. | A47J 31/44 |

OTHER PUBLICATIONS

Notification of Grant issued for GB1912385.0 dated Nov. 30, 2021.
Search Report issued for GB2114758.2 dated Nov. 12, 2021.
Search Report issued for GB2114762.4 dated Nov. 12, 2021.
Extended European Search Report issued for EP20191133.6, dated Dec. 4, 2020.

* cited by examiner

RECYCLING OF INFUSION CAPSULES

FIELD OF THE INVENTION

The present invention relates to devices for assisting in the recycling of single-serve infusion capsules.

BACKGROUND ART

Single-serve containers have become a very popular method of preparing coffee and other infusions. They generally contain enough coffee for a single portion, and are used in conjunction with a suitable machine which uses the containers to brew the infusion. Single-serve coffee containers can both reduce the time needed to brew coffee and simplify the brewing process by eliminating the need to measure out portions, flavourings, and additives from large bulk containers. They can also help to keep the unused product fresher by individually packaging portions separately without exposing the entire supply batch to air and light.

For coffee, the containers currently come in a number of forms. Coffee pods are pre-packaged ground coffee beans in their own filter. Coffee bags are modelled on tea bags, and consist of a gauze bag containing a mixture of instant coffee and finely ground roast coffee, which is to be steeped in hot water for approximately three minutes. Coffee capsules comprise a plastic or aluminium package (instead of a paper filter) which contains the coffee, are usually designed for use with a single brand or system, and are often not interchangeable with other systems. An example of a coffee capsule is shown at EP0512148A1.

Paper coffee pods, such as those used in 'Easy Serving Espresso Pod' ('ESE Pod') or Senseo™ machines have the benefit of being a fully biodegradable product that can decompose naturally. The plastic and/or metal capsules such as those used in the Keurig®, Tassimo® and Nespresso® machines are generally not recyclable as they are often composed of a mix of plastic, aluminium, and organic material (the used coffee) which makes them difficult to recycle. As a result, in 2016 the German city of Hamburg banned coffee capsules from state-run buildings on environmental grounds.

The capsules generally have defined standard dimensions, which enables them to fit into a range of compatible machines and work reliably. Where compatible capsules are available from multiple sources, the various manufacturers generally aim to conform closely to the standard dimensions of the capsule system in question, so that their capsules will fit and will work reliably.

The company Nowpresso Limited of Kowloon, Hongkong has proposed a recycling device which allows separation of some elements of certain capsules. As shown at https://nowpresso.com/, it consists of a base with an aperture sized to allow a standard aluminium Nespresso™ capsule to sit over the aperture, supported by its rim on a flat annular surface surrounding the aperture. A plunger is provided to compress the capsule against the annular surface, which collapses and inverts the aluminium capsule, expelling the used coffee grounds into a receptacle below and thus leaving just the aluminium behind. The two elements of the capsule can then be recycled separately.

SUMMARY OF THE INVENTION

The present invention seeks to improve upon the Nowpresso device, which generally only works with silicone-sealed capsules, and is less able to cope with other designs of capsule—especially those which employ seal arrangements that are intrinsically more recyclable.

The present invention therefore provides a device for separating infusion capsules, comprising a base unit and a plunger, the base unit having a face with an aperture for receiving a body part of the capsule, wherein a portion of the face surrounding the aperture has a surface that undulates in a longitudinal direction relative to a central axis through the aperture; the plunger comprising a projection sized to fit within the aperture.

A capsule can be placed, rim side down, on the base unit over the aperture, and the plunger used to urge the capsule down into the aperture. The result is that the capsule inverts, rupturing the foil layer and emptying the coffee or other infusion into the base unit below the aperture. The coffee (etc) and the capsule can then be removed for separate recycling. The undulating surface ensures that the rim section of the capsule is distorted during this process, which assists in separating any layers that have been provided for example by way of sealant. Some capsules crimp the rim and seal with a silicone or similar composition; other more recyclable capsules employ a paper seal which is separated by the device of the present invention thus allowing each element to be recycled appropriately.

We prefer that the portion is level in the radial direction relative to the central axis, as this assists in retaining the capsule in place during the process. The undulations are thus in the longitudinal direction, and preferably includes at least one section that is helical relative to the central axis. Other sections that are preferable to include are substantially upright relative to the face. Overall, we particularly prefer that the surface includes at least one part consisting of, in order, a sub-section that is substantially upright relative to the face; a sub-section that is helical relative to the central axis in a first direction, a sub-section that is helical relative to the central axis in a second direction, opposed to the first direction, and a sub-section that is substantially upright relative to the face. Ideally, the surface comprises two such parts; these can be separated by two flat sections, and are preferably arranged rotationally symmetrically around the central axis.

The face can one or more upstanding ridges surrounding the portion. These act to locate the capsule correctly over the aperture, and prevent it from spreading outwardly during the process. Thus, the ridges are ideally located so as to surround a rim of a standard-sized infusion capsule.

Most capsules are circularly symmetric, so we prefer that the aperture is circular. It should be sized to receive a body of a standard-sized infusion capsule, but not an exterior rim thereof.

We prefer that the projection (of the plunger) is sized so that, when fully inserted via the aperture, it extends beyond the face by a distance which is not greater than but is a substantial part of the depth of a standard-sized infusion capsule. The result of this is that the plunger substantially completely inverts the capsule when pressed, ejecting as much of the content of the infusion capsule as possible instead of allowing some to be trapped in creases in the capsule material. This also means that the emptied capsules can be stacked, reducing the space needed for storage while they are awaiting recycling.

We also prefer that the projection has a tip for contacting the infusion capsules which is concave. This self-centres the top of the capsule centrally onto the plunger, meaning the capsules correctly align themselves and the inversion process is more consistent.

The infusion capsule will usually contain ground coffee, but the invention can be applied to capsules containing other infusions.

BRIEF DESCRIPTION OF THE DRAWINGS

An embodiment of the present invention will now be described by way of example, with reference to the accompanying figures in which.

DETAILED DESCRIPTION OF THE EMBODIMENTS

Figure 1:
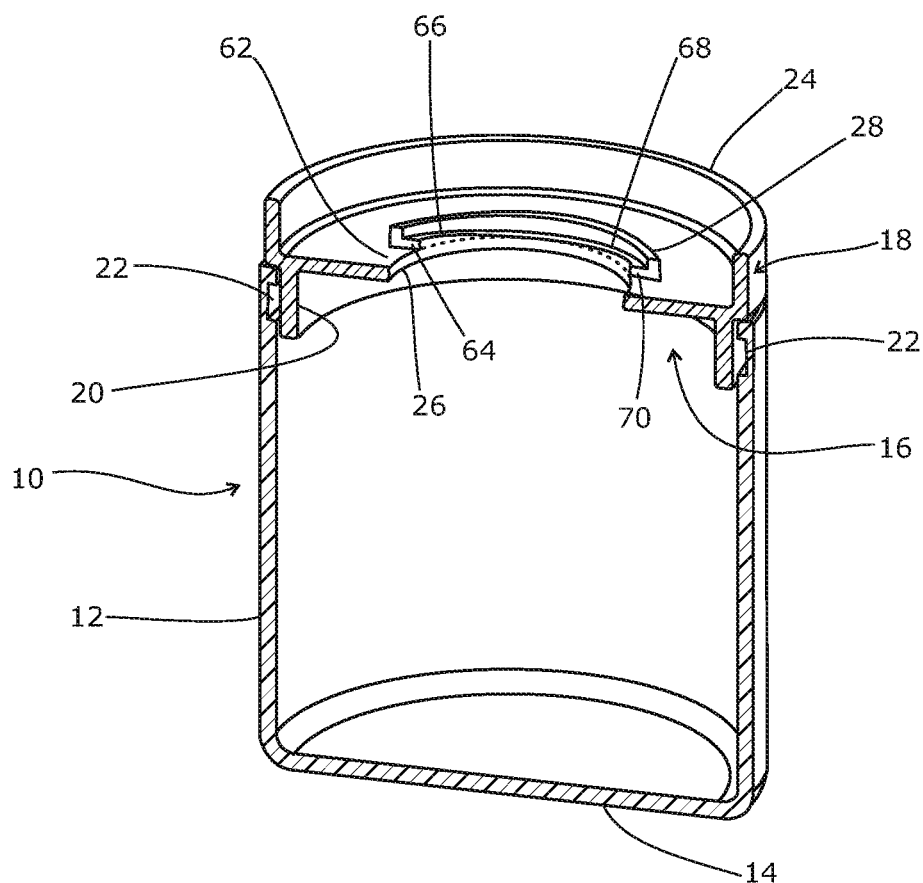
FIG. 1 shows a vertical section through the base unit of the present invention.

FIG. 1 shows a base unit 10 according to the present invention, in section. A hollow cup-shaped receptacle 12 is generally cylindrical in form, with a closed lower face 14 and an open upper face 16. A lid 18 is located over the open upper face 16; the lid 18 is circular in order to match the cylindrical shape of the receptacle. It has a downwardly-depending skirt 20; this is cylindrical and located concentrically on the lid 18, sized to fit within the receptacle 12. Alternatively, if the receptacle 12 is not cylindrical, the skirt 20 could be shaped correspondingly or otherwise appropriately in order to locate the lid 18 over the receptacle 12. Alternatively, or in addition, the skirt 20 could locate around the exterior of the receptacle 12. A set of lugs (not shown) on the outer face of the skirt 20 locate within dog-leg shaped keyways 22 on the interior face of the receptacle 12 to allow the lid 18 to be releasably fastened in place over the receptacle 12. In this case there are two lugs, located symmetrically opposite each other, but this could be varied.

The lid 18 has an outer rim 24 which serves to contain any spilled material, and provides additional rigidity to the lid 18. This extends upwardly from the outer edge of the lid 18 and is also cylindrical in form. It could be of a different shape, or it could be omitted.

Figure 2:
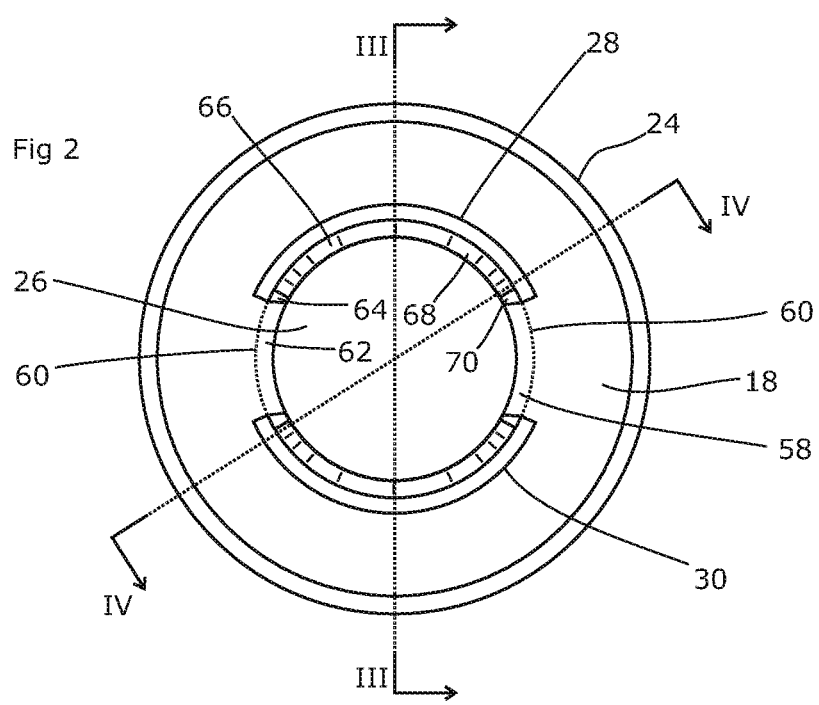
FIG. 2 shows the lid of the base unit of FIG. 1, from above.
Figure 3:
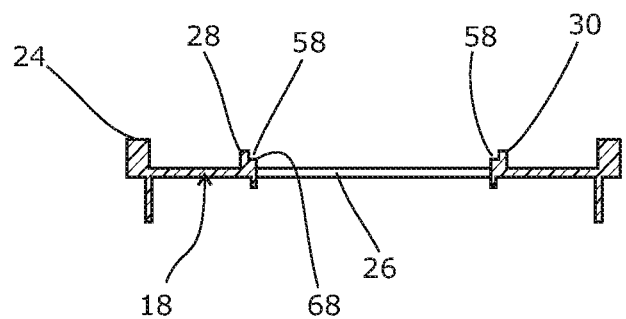
FIG. 3 shows a section through the lid on III-III of FIG. 2.

The lid 18 also has a central aperture 26, which can also be seen in FIG. 2. This is circular, and located concentrically on the lid 18; this positioning is not essential but does make operation of the device more straightforward. The aperture is surrounded by a pair of upstanding ridges 28, 30 which (together) encircle about 75% of the aperture 26 leaving a pair of radially-opposed gaps between them for the remainder. Generally, the ridges 28, 30 should occupy at least about 70% of the circumference around the aperture 26.

Figure 4:
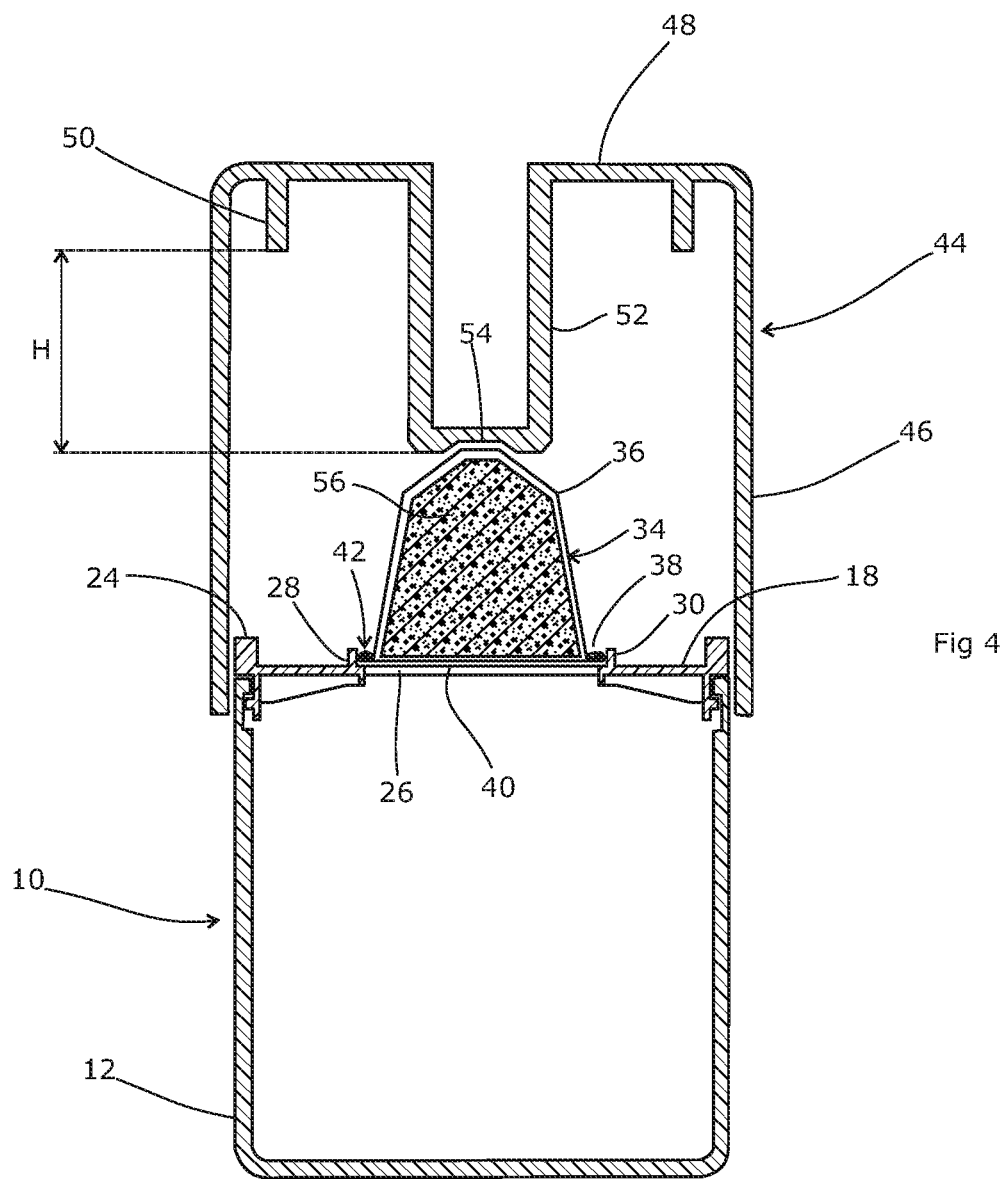
FIG. 4 shows a section through the lid, base unit and plunger on VI-VI of FIG. 2.

FIG. 4 shows the complete device, in section, with a standard Nespresso®-compatible capsule 34 in place over the aperture 26. These capsules 34 conform to a standard set of dimensions which are generally known and were established by the originators of the design; in order to be compatible, capsules 34 must adhere to these dimensions so that they fit correctly into compatible brewing machines and operate correctly and safely. Accordingly, it is possible to be confident that the dimensions of the capsule 34 will be predictable. Other infusion capsule systems exist, and if the skilled person wishes to design a device adapted to such a system then the appropriate changes can be made to the dimensions of the device.

From FIG. 4, it is apparent that the capsule 34 has a tapering body portion 36 ending at its widest point with a flange 38 onto which is fixed a foil lid 40, and at its narrowest point with a closed dome section. The body portion 36 is made of a thin aluminium sheet and the lid 40 of a fine aluminium foil which is sealed onto the flange. The sealing step can be carried out in a range of manners, such by an adhesive between the flange 38 and the lid 40, or by wrapping the lid 40 around the flange 38 and applying an annular-shaped adhesive tape 42 over the flange 38 and the lid 40.

FIG. 4 also shows that the aperture 26 is sized to accept the body portion 36 of the capsule 34, but not the flange 38. Thus, when the capsule 34 is placed body-portion-uppermost over the aperture 26, it will rest on the edges of the aperture 26, supported by flange 38. The ridges 28, 30 are located so that they are positioned immediately surrounding the flange 38, thus allowing the capsule 34 to be placed accurately and held in position concentrically over the aperture 26.

Figure 5:
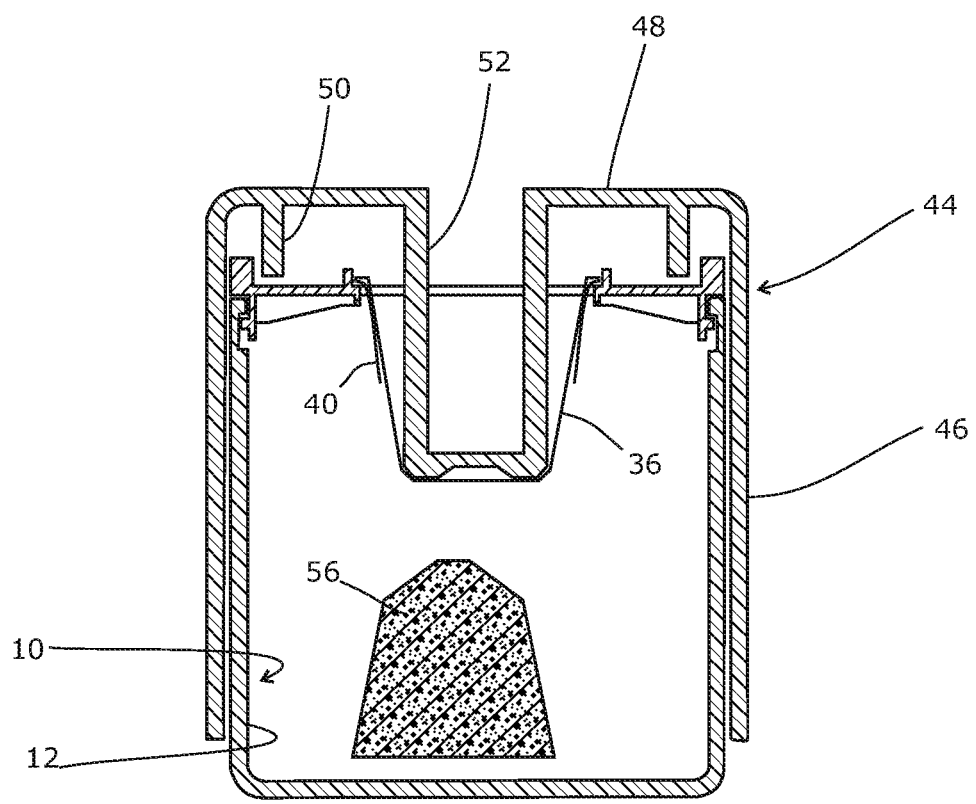
FIG. 5 shows the lid, based unit and plunger of the present invention after operation.

FIG. 4 also shows the plunger unit 44. This consists of an inverted cylindrical cup section 46, shaped and sized to fit over and around the receptacle 12. It has an upper lid 48; this supports a concentric ring 50 which serves as a stop to limit how far the plunger 44 can be pressed down onto the base unit 10; eventually the ring 50 will meet the lid 18 and prevent further movement. In the centre of the plunger 44, there is a projection 52 sized to fit within the aperture 26, and also located centrally on the plunger 44 so that it will pass through the aperture 26. The tip of the projection 52 has a concave recess 54 which is sized to fit over the dome section atop the capsule 34. Thus, the plunger 44 can be positioned over the base unit 10 with a capsule 34 in place as described above, and the plunger depressed so as to urge the projection into contact with the capsule 34. This will then lead to the state shown in FIG. 5, with the projection 52 having caused the foil lid 40 to rupture, inverted the body portion 36, and ejected the contents 56 of the capsule 34 into the receptacle 12.

The working length of the projection 52, i.e. the height H of the projection 52 over the ring 50 (or whatever part of the plunger 44 limits its movement downwards over the base unit 10) is less than the overall height of the standard-sized capsule 34, but only by a small margin. Thus, the working length H is a substantial part of the height of the capsule. This ensures that the capsule is fully inverted, ejecting as must of the contents 56 as is possible. The concave recess 54 and the ridges 28, 30 each assist in ensuring that the capsule 34 remains in position during its inversion. Thus, the tapering nature of the capsule 34 means that the net force at the flange 38 is generally outwards, and therefore the flange is restrained effectively by the surrounding ridges 28, 30. At the top of the capsule 34, the concave recess 54 retains the dome section of the capsule 34 and prevents it from moving sideways, thus keeping the capsule aligned correctly.

Between the aperture 26 and the ridges 28, 30, there is a supporting ledge 58 on which the flange 38 rests (above). The dotted lines 60 in FIG. 2 indicate the extent of the supporting ledge 58 in the gaps between the ridges 28, 30. According to the present invention, this supporting ledge 58 is not flat. We have found that by providing a non-flat supporting ledge 58, the flange is disrupted or distorted during the inversion process which causes any adhesive tape 42 placed over the flange 38 as a seal to be separated from the flange 38. After the inversion process is complete, as a result of the non-flat nature of the supporting ledge 58, the adhesive tape 42 is usually detached from the remainder of the capsule. As a result, the capsule is effectively separated into its three material components; the contents 56 are in the receptacle 12, the aluminium parts are sitting over the aperture 26, and the adhesive tape is lying loosely over the aluminium parts. Separation of the materials for recycling is therefore straightforward.

The particular non-flat shape of the supporting ledge 58 shown in the embodiment of FIGS. 1 to 5 comprises a bihelical slope on the inner side of each of the upstanding ridges 28, 30. This slope results in the ledge 58 being highest adjacent the ends of the ridges 28, 30 (FIG. 3) and lowest at the midpoint of the ridges 28, 30 (FIG. 4). Thus, at the ends of the ridges 28, 30, the ledge 58 is at approximately half the height of the ridges 28, 30. At the midpoint, the ledge 58 is level with the remainder of the outer face of the lid 18 on the other side of the ridges 28, 30. In the areas outside the ridges, i.e. in the gaps between the ridges 28, 30, the ledge 58 is flat and level with the remainder of the outer face of the lid 18.

As a result, the non-flat shape of the ledge 58 consists, in this embodiment, of a sub-section 62 alongside a gap between the ridges 28, 30 which is flat and level with the remainder of the outer face of the lid 18, followed by (moving circumferentially around the aperture 26) a substantially upright section 64 (relative to the surface of the lid 18) which raises the level of the ledge 58 to about half the height of the ridge 28) and then a sub-section 66 that descends helically (relative to a central axis through the aperture 26) to a point midway along the ridge 28 at which point the ledge 58 is again level with the remainder of the outer face of the lid 18. This is followed by a sub-section 68 that rises helically relative to the central axis, ending with a sub-section 70 that is substantially upright relative to the lid 18 at which the ledge drops to be level with the remainder of the outer face of the lid 18. The ledge is then flat and level in the second gap between the ridges 28, 30, and the pattern is repeated adjacent the remaining ridge 30.

Other non-flat profiles for the ledge 58 are of course possible. For example, a corrugated or sawtooth pattern could be provided. The pattern could be continuous around the aperture, or the intervals could be located elsewhere than in the gaps between the upstanding ridges 28, 30. Likewise, more gaps, fewer gaps, or no gaps could be provided in the upstanding ridges 28, 30. We have found that the profile described above and shown in FIGS. 1 to 5 is straightforward to manufacture and effective in separating the elements of the capsule 34, however.

It will of course be understood that many variations may be made to the above-described embodiment without departing from the scope of the present invention.

The invention claimed is:

1. A device for separating infusion capsules, comprising a base unit and a plunger,
   the base unit having a face with an aperture for receiving a body part of the capsule, wherein a portion of the face surrounding the aperture has a surface that undulates in a longitudinal direction relative to a central axis through the aperture;
   the plunger comprising a projection sized to fit within the aperture.

2. The device according to claim 1, in which the portion is level in a radial direction relative to the central axis.

3. The device according to claim 1, in which the surface includes at least one section that is helical relative to the central axis.

4. The device according to claim 1, in which the surface includes at least one section that is upright relative to the face.

5. The device according to claim 1, in which the surface includes at least one part consisting of, in order;
   a sub-section that is upright relative to the face;
   a sub-section that is helical relative to the central axis in a first direction;
   a sub-section that is helical relative to the central axis in a second direction, opposed to the first direction; and
   a sub-section that is upright relative to the face.

6. The device according to claim 5, wherein the surface further comprises another part consisting of, in order:
   a sub-section that is upright relative to the face;
   a sub-section that is helical relative to the central axis in a first direction;
   a sub-section that is helical relative to the central axis in a second direction, opposed to the first direction; and
   a sub-section that is upright relative to the face.

7. The device according to claim 6 in which the two parts are separated by two flat sections.

8. The device according to claim 6 in which the two parts are arranged rotationally symmetrically around the central axis.

9. The device according to claim 1, in which the face has one or more upstanding ridges surrounding the portion.

10. The device according to claim 9, in which the upstanding ridges are located so as to surround a rim of a standard-sized infusion capsule.

11. The device according to claim 1, in which the aperture is circular.

12. The device according to claim 1, in which the aperture is sized to receive a body of a standard-sized infusion capsule, but not an exterior rim thereof.

13. The device according to claim 1, in which the projection is sized so that, when fully inserted via the aperture, it extends beyond the face by a distance which is not greater than but is a substantial part of the depth of a standard-sized infusion capsule.

14. The device according to claim 1, in which the projection has a tip for contacting the infusion capsules which is concave.

15. The device according to claim 1, in which the infusion capsule contains ground coffee.

* * * * *